United States Patent
Arnold et al.

(10) Patent No.: US 11,199,629 B2
(45) Date of Patent: Dec. 14, 2021

(54) METHOD AND DEVICE FOR PROVIDING RAW CORRECTION DATA FOR CORRECTING ATMOSPHERIC DISTURBANCES FOR SATELLITE NAVIGATION, AND METHOD AND DEVICE FOR DETERMINING CORRECTION DATA FOR CORRECTING ATMOSPHERIC DISTURBANCES FOR SATELLITE NAVIGATION

(71) Applicant: Robert Bosch GmbH, Stuttgart (DE)

(72) Inventors: Jan-Christian Arnold, Ludwigsburg (DE); Nikolas Lentz, Ilsfeld (DE)

(73) Assignee: Robert Bosch GmbH, Stuttgart (DE)

( * ) Notice: Subject to any disclaimer, the term of this patent is extended or adjusted under 35 U.S.C. 154(b) by 388 days.

(21) Appl. No.: 16/272,136

(22) Filed: Feb. 11, 2019

(65) Prior Publication Data

US 2019/0250276 A1 Aug. 15, 2019

(30) Foreign Application Priority Data

Feb. 14, 2018 (DE) ..................... 10 2018 202 225.9

(51) Int. Cl.
| | | |
|---|---|---|
| G01S 19/07 | (2010.01) | |
| G01S 19/27 | (2010.01) | |
| G05D 1/02 | (2020.01) | |
| G01S 19/14 | (2010.01) | |
| G01S 19/34 | (2010.01) | |
| G01S 19/41 | (2010.01) | |

(52) U.S. Cl.
CPC .............. *G01S 19/07* (2013.01); *G01S 19/14* (2013.01); *G01S 19/27* (2013.01); *G05D 1/0278* (2013.01); *G01S 19/34* (2013.01); *G01S 19/41* (2013.01); *G05D 2201/0213* (2013.01)

(58) Field of Classification Search
CPC .......... G01S 19/07; G01S 19/14; G01S 19/27; G01S 19/41; G01S 19/20; G01S 19/08; G01S 5/009; G05D 1/0278
USPC ..................................................... 342/357.44
See application file for complete search history.

(56) References Cited

U.S. PATENT DOCUMENTS

| | | | |
|---|---|---|---|
| 9,612,340 B1 | 4/2017 | Miller et al. | |
| 2003/0067409 A1 | 4/2003 | Murphy | |
| 2009/0322515 A1* | 12/2009 | Kirchner | ................. G01S 19/40 340/539.13 |
| 2013/0271324 A1* | 10/2013 | Sendonaris | ........... G01S 5/0236 342/450 |

(Continued)

*Primary Examiner* — Harry K Liu
(74) *Attorney, Agent, or Firm* — Maginot, Moore & Beck LLP

(57) ABSTRACT

A method for providing raw correction data for correcting atmospheric disturbances for satellite navigation includes checking whether a mobile satellite receiver for satellite navigation is in an immobile state using at least one sensor signal. The sensor signal represents a measurement variable dependent on a state of movement of the mobile satellite receiver. The method further includes evaluating at least one satellite signal transmitted between at least one satellite and the mobile satellite receiver in the immobile state with regard to a signal property dependent on atmospheric disturbances in order to generate the raw correction data. The raw correction data represents an item of information regarding the atmospheric disturbances.

13 Claims, 3 Drawing Sheets

(56) References Cited

U.S. PATENT DOCUMENTS

2016/0036519 A1  2/2016  Loomis et al.

* cited by examiner

METHOD AND DEVICE FOR PROVIDING RAW CORRECTION DATA FOR CORRECTING ATMOSPHERIC DISTURBANCES FOR SATELLITE NAVIGATION, AND METHOD AND DEVICE FOR DETERMINING CORRECTION DATA FOR CORRECTING ATMOSPHERIC DISTURBANCES FOR SATELLITE NAVIGATION

This application claims priority under 35 U.S.C. § 119 to patent application no. DE 102018202225.9 filed on Feb. 14, 2018 in Germany, the disclosure of which is incorporated herein by reference in its entirety.

The disclosure is based on methods or a device of the genre as disclosed. Another subject of the disclosure is a computer program.

BACKGROUND

Accurate position determination is important in particular for highly automated driving and other applications. In order to correct positioning signals in satellite navigation, deviations in the Earth's atmosphere may be taken into account, by way of example.

SUMMARY

Against this background, with the approach presented here, methods, as well as a device that uses one of these methods, and also lastly a corresponding computer program according to the disclosure are provided. Advantageous developments and improvements of the device specified in the disclosure are possible by way of the measures outlined in the disclosure.

According to embodiments, it may be made possible in particular to identify correction data for a differential navigation system by using navigation terminals as an information source with regard to disturbances that may arise due to changes in propagation time in the Earth's atmosphere, in particular in the ionosphere and troposphere. Information from this information source may be processed for example on a server or in what is called the data cloud or cloud so as to form correction data. Thus, for example, a differential position determination for vehicles or the like may also be made possible by way of reference stations in the form of mobile satellite receivers in an immobile state. In other words, correction data for satellite navigation may be determined, additionally or alternatively to fixed reference stations, using navigation terminals that are able to compile information so as to make it possible to identify correction data on a server or in the cloud. One field of use for such correction data may be in particular in the field of highly automated driving or of a sensor that is able to identify a position of a vehicle on the basis of satellite navigation or satellite-assisted position determination. Identifying data in order to calculate a correction signal may be useful for example in a navigation terminal or satellite receiver that has an acceleration sensor, a gyroscope or the like, for example.

Advantageously, according to embodiments, in particular a particularly accurate position determination is able to be achieved using navigation satellites (GNSS, global navigation satellite system) for highly automated driving and other applications. By way of example, according to embodiments, inaccuracies that arise for example due to changes in signal propagation time in the ionosphere and troposphere are able to be corrected. To improve accuracy in position determination, correction data may be used in differential satellite navigation systems in order for example to allow a position determination with accuracy to the centimeter. To identify the correction data, additionally or alternatively to fixed reference stations, mobile satellite receivers in a stationary state may be used, which may make it possible to identify correction data on the basis of a known and unchanging position. A number of reference stations is able to be increased in particular as a result. By way of example, a satellite receiver arranged in a vehicle could both be used for position determination and function as a reference station in the immobile state. A vehicle fleet is thus in particular able to exploit a new area without coverage using reference stations.

It may be made possible for example that no or fewer reference stations, or fewer new reference stations fixedly installed at a site, need to be operated. Due to a multiplicity of satellite receivers functioning as reference stations, a correction service for satellite navigation is able to be operated inexpensively, an accuracy being able to be by increasing the number and density of the terminals functioning as reference stations. The correction data may be made available to navigation devices for example via radio transmission, which navigation devices are able to determine a more accurate position therefrom in connection with received satellite signals.

A method for providing raw correction data for correcting atmospheric disturbances for satellite navigation is proposed, wherein the method has the following steps:

checking whether a mobile satellite receiver for satellite navigation is in an immobile state, using at least one sensor signal, wherein the sensor signal represents a measurement variable dependent on a state of movement of the mobile satellite receiver; and evaluating at least one satellite signal transmitted between at least one satellite and the mobile satellite receiver in the immobile state with regard to a signal property dependent on atmospheric disturbances in order to generate the raw correction data, wherein the raw correction data represent an item of information regarding the atmospheric disturbances.

This method may be implemented for example in software or hardware or in a mixed form of software and hardware, for example in a controller or a device. The raw correction data may be used to determine correction data for correcting satellite signals with regard to atmospheric disturbances. The mobile satellite receiver may be designed so as to allow a position determination, using at least one satellite signal, through satellite navigation for a user and additionally or alternatively for equipment of a user. The mobile satellite receiver may be configured as a dual-frequency satellite receiver or multifrequency satellite receiver. The mobile satellite receiver may be arranged in a vehicle. In the immobile state of the mobile satellite receiver, the mobile satellite receiver may be arranged so as to be stationary or immobile relative to a reference point fixed to the Earth. The sensor signal may be provided for example by a motion sensor, such that the measurement variable may be an acceleration, for example.

According to one embodiment, the method may have a step of determining a geographical position of the mobile satellite receiver. In this case, in the evaluation step, the geographical position may be taken into account in order to generate raw correction data that represent an item of information regarding atmospheric disturbances in relation to the geographical position. Such an embodiment offers the advantage that an accurate overview with regard to atmospheric disturbances with spatial resolution is able to be made possible.

In this case, in the determination step, the geographical position may be determined using the at least one satellite signal, using at least one further sensor signal that represents a further measurement variable able to be correlated with the geographical position of the mobile satellite receiver, using a position signal that represents a geographical position of a stationary apparatus that is temporarily coupled to a system having the mobile satellite receiver, and additionally or alternatively using at least one movement signal that represents at least one movement variable, by way of which the geographical position of the mobile satellite receiver is able to be identified on the basis of a previous geographical position of the mobile satellite receiver. The further sensor signal may be provided by a radar sensor, a video sensor or the like. Able to be correlated may be understood to mean that the further measurement variable may be assigned to the geographical position or that the geographical position is able to be determined from the further measurement variables, for example using an assignment table. If the further measurement variable constitutes an image, the geographical position may be determined for example on the basis of an object depicted by the image, which object may be assigned to the geographical position. In addition to the sensor signal, map data may be used. The stationary apparatus may be a charging station for charging an electric vehicle or hybrid vehicle. The movement signal may be provided by an acceleration sensor or the like. Such an embodiment offers the advantage that the geographical position is able to be determined reliably and accurately using at least one respectively suitable or available sensor signal. An accuracy of the position determination may additionally be improved the longer the mobile satellite receiver is in the immobile state.

Furthermore, the checking step and additionally or alternatively the evaluation step may be performed repeatedly. In this case, a repetition frequency may be set depending on an energy supply state and additionally or alternatively depending on a geographical position of the mobile satellite receiver. In other words, the checking step and additionally or alternatively the evaluation step may be performed repeatedly at a settable repetition frequency. Such an embodiment offers the advantage that operation of the mobile satellite receiver as reference station is able to be tailored such that energy reserves are able to be preserved. Additionally or alternatively, with regard to the repetition frequency, it may also be taken into account whether the geographical position of the mobile satellite receiver indicates an urban environment, a rural environment or the like. In an urban environment, a repetition frequency may be reduced as other mobile satellite receivers may be known or are able to be assumed in the vicinity of the geographical position.

According to one embodiment, in the evaluation step, the raw correction data may be generated using a signal property of the at least one satellite signal that relates to a signal propagation time and additionally or alternatively to a change in signal propagation time of the at least one satellite signal. In this case, the signal property may represent a result of a comparison of at least one signal value with respect to at least two transmission frequencies of the at least one satellite signal. Such an embodiment offers the advantage that the raw correction data are able to be identified reliably and accurately.

A method for determining correction data for correcting atmospheric disturbances for satellite navigation is also proposed, wherein the method has the following steps:

reading in raw correction data provided in accordance with one embodiment of the abovementioned method from a multiplicity of mobile satellite receivers in the immobile state; and identifying the correction data using the raw correction data.

The determination method may advantageously be performed in connection with one embodiment of the abovementioned provision method. In this case, the raw correction data provided by performing an embodiment of the abovementioned provision method may be used in the determination method. The correction data may be used to carry out a correction of satellite signals with regard to deviations, disturbances and additionally or alternatively a current atmospheric state.

According to one embodiment, in the reading-in step, the raw correction data may be read in from a multiplicity of mobile satellite receivers, at least one mobile satellite receiver of which is arranged in a vehicle. At least one mobile satellite receiver of the multiplicity of mobile satellite receivers may optionally be a mobile satellite receiver independent of a vehicle. Such an embodiment offers the advantage that a multiplicity of mobile satellite receivers able to be operated as reference stations are able to be utilized for data acquisition, such that a dense network of reference stations and thus secure and exact determination of correction data may be made possible.

In the identification step, the correction data may also be identified using a multiplicity of reference state signals, using an atmospheric correction model and additionally or alternatively using a model algorithm. In this case, the reference state signals may represent signals read in from stationary reference satellite receivers. The multiplicity of reference satellite receivers may be arranged in a regional, supra-regional and additionally or alternatively global grid or network. Such an embodiment offers the advantage that an accuracy of corrections with regard to atmospheric disturbances is able to be further increased, and thus satellite navigation is able to be further improved.

Furthermore, the method may have a step of outputting the correction data to the multiplicity of mobile satellite receivers. In this case, the correction data may be able to be used for a correction of a transmission of the at least one satellite signal between the at least one satellite and the multiplicity of mobile satellite receivers. Such an embodiment offers the advantage that an accuracy of a position determination by the mobile satellite receivers is able to be improved both for operation for satellite navigation and for operation as a reference station.

The approach proposed here furthermore provides a device that is designed so as to perform, drive or implement the steps of a variant of a method proposed here in corresponding apparatuses. Through this implementation variant of the disclosure in the form of a device as well, the object on which the disclosure is based is able to be achieved quickly and efficiently.

To this end, the device may have at least one computer unit for processing signals or data, at least one storage unit for storing signals or data, at least one interface to a sensor or an actuator for reading in sensor signals from the sensor or for outputting data or control signals to the actuator and/or at least one communication interface for reading in or outputting data that are embedded into a communication protocol. The computer unit may be for example a signal processor, a microcontroller or the like, wherein the storage unit may be a flash memory, an EEPROM or a magnetic storage unit. The communication interface may be designed so as to read in or output data wirelessly and/or in a wired manner, wherein a communication interface that is able to read in or output the wired data is able, for example electrically or optically, to read in these data from a corresponding data transmission line or to output them into a corresponding data transmission line.

A device in the present case may be understood to mean an electrical unit that processes sensor signals and outputs control and/or data signals in a manner dependent thereon. The device may have an interface that may be designed in hardware form and/or in software form.

In the case of a design in hardware form, the interfaces may be for example part of what is called a system ASIC that contains a wide variety of functions of the device. It is also possible, however, for the interfaces to be individual integrated circuits or to consist at least partly of discrete components. In the case of a design in software form, the interfaces may be software modules that are present on a microcontroller alongside other software modules, for example.

In one advantageous refinement, the device may be configured as part of a mobile satellite receiver or of an apparatus connected to the mobile satellite receiver, and optionally additionally as part of a data processing apparatus of a correction service. In this case, the device controls at least one mobile satellite receiver in order to compile raw correction data and additionally or alternatively for satellite-assisted navigation using correction data. For this purpose, the device may access for example satellite signals, sensor signals, such as for example radar signals, video signals, acceleration signals and the like, position signals, movement signals and the like. Driving is performed via signal transmission apparatuses such as transmitters, transceivers and antennae.

Also advantageous is a computer program product or computer program containing program code that may be stored on a machine-readable carrier or storage medium, such as a semiconductor memory, a hard disk memory or an optical memory, and is used to perform, implement and/or drive the steps of a method according to one of the embodiments described above, in particular when the program product or program is executed on a computer or a device.

BRIEF DESCRIPTION OF THE DRAWINGS

Exemplary embodiments of the approach proposed here are illustrated in the drawings and explained in more detail in the following description. In the figures.

DETAILED DESCRIPTION

In the following description of expedient exemplary embodiments of the disclosure, elements illustrated in the various figures that operate in a similar manner are given the same or similar reference signs, repeated description of these elements being dispensed with.

Figure 1:
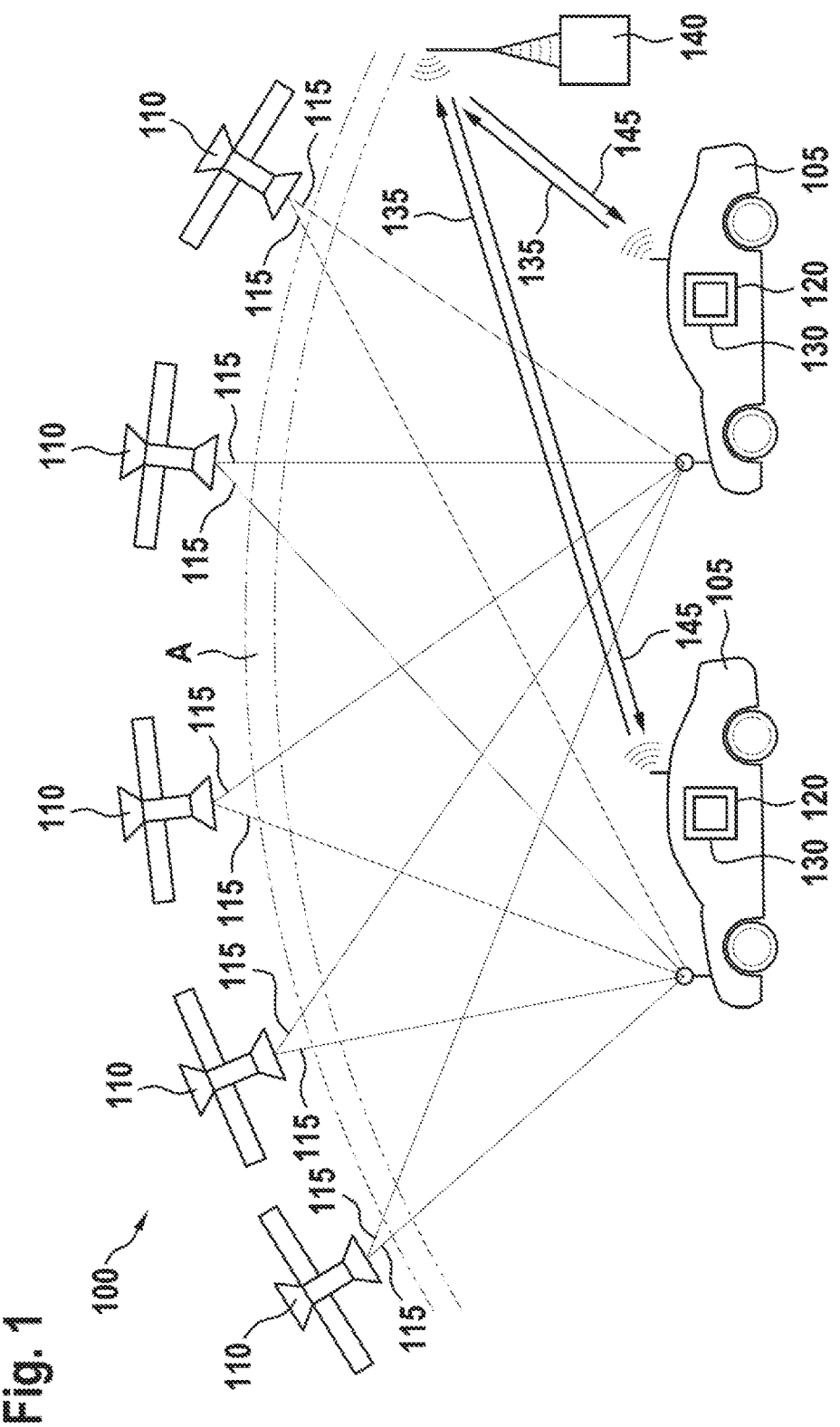
FIG. 1 shows a schematic illustration of a system for satellite navigation according to one exemplary embodiment.

FIG. 1 shows a schematic illustration of a system 100 for satellite navigation according to one exemplary embodiment. The system 100, in accordance with the exemplary embodiment illustrated in FIG. 1, has a multiplicity of satellites 110, here just five satellites 110 by way of example, just two mobile satellite receivers 120 by way of example, each of which is arranged in an individual vehicle 105, just two provision devices 130 by way of example, each of which is configured as part of the satellite receivers 120, and a determination device 140 that is arranged so as to be remote from the vehicle 105 containing the satellite receivers 120 and provision devices 130. Furthermore, the Earth's atmosphere A, in particular the ionosphere, is schematically shown between the satellites 110, on the one hand, and the vehicles 105 containing the satellite receivers 120 and provision devices 130, on the other hand. Disturbances may occur in the atmosphere A.

Each of the mobile satellite receivers 120, and thus each of the provision devices 130, is connected to the satellites 110 so as to be capable of transmitting a signal. Satellite signals 115 are transmitted between the satellites 110 and the mobile satellite receivers 120. The vehicles 105 in which the mobile satellite receivers 120 are arranged with the provision devices 130 are in a parked state in the illustration of FIG. 1. The mobile satellite receivers 120 are thus in an immobile or stationary state. Each of the mobile satellite receivers 120, and thus each of the provision devices 130, is connected to the determination device 140 so as to be capable of transmitting a signal.

Each of the provision devices 130 is designed so as, using the satellite signals 115 to correct atmospheric disturbances for satellite navigation, to provide raw correction data 135. The raw correction data 135 represent an item of information regarding atmospheric disturbances. The determination device 140 is designed so as, using the raw correction data 135, to then determine correction data 145 to correct atmospheric disturbances for satellite navigation. The correction data 145 are able to be used for a correction of a transmission, impaired by atmospheric disturbances, of the at least one satellite signal 115 between the at least one satellite 110 and the multiplicity of mobile satellite receivers 120.

Signals are thus transmitted between the provision devices 130 and the determination device 140, which signals represent the raw correction data 135 and the correction data 145. In this case, the raw correction data 135 are transmitted from the provision devices 130 to the determination device 140. The correction data 145 are transmitted from the determination device 140 to the provision devices 130.

More detail is provided below with regard to the provision devices 130 and the determination device 140, inter alia, with reference to FIG. 2.

Figure 2:
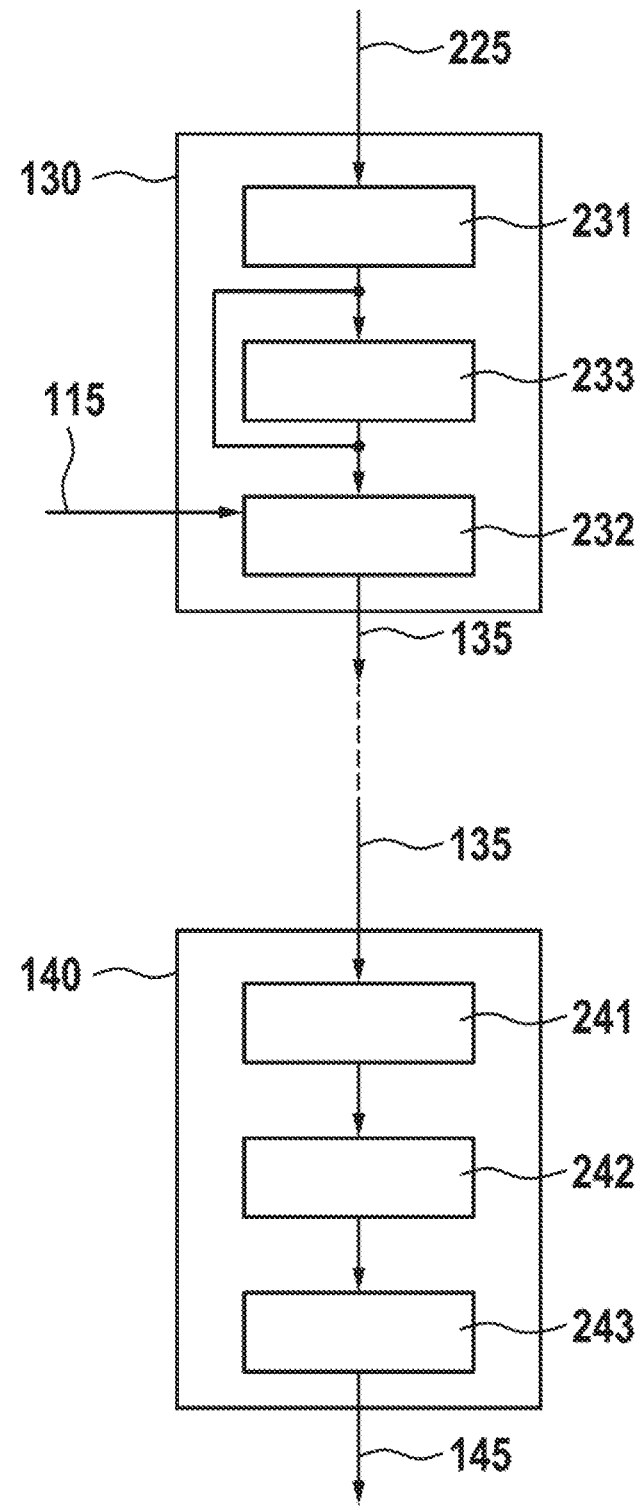
FIG. 2 shows a schematic illustration of parts of the system from FIG. 1.

FIG. 2 shows a schematic illustration of parts of the system from FIG. 1. From the system from FIG. 1, one provision device 130 of the provision devices and the determination device 140 are shown in this case.

The provision device 130 has a checking apparatus 231 and an evaluation apparatus 232. The checking apparatus 231 is designed so as to use at least one sensor signal 225 to check whether a mobile satellite receiver for satellite navigation is in an immobile state, that is to say is at a standstill for example. In this case, the checking apparatus 231 and/or the provision device 130 is designed so as to receive or read in the at least one sensor signal 225. The sensor signal 225 represents a measurement variable dependent on a state of movement of the mobile satellite receiver, for example an acceleration, speed or change in position. The checking apparatus 231 is furthermore designed so as to forward a checking result directly or indirectly to the evaluation apparatus 232.

The evaluation apparatus 232 is designed so as to evaluate at least one satellite signal 115 that is transmitted between the at least one satellite and the mobile satellite receiver, while the mobile satellite receiver is in the immobile state, with regard to a signal property dependent on atmospheric disturbances, in order to generate the raw correction data 135. The provision device 130 is designed so as to provide the raw correction data 135 for output to the determination device 140.

According to the exemplary embodiment illustrated here, the provision device 130 furthermore has a determination apparatus 233. The determination apparatus 233 is designed so as to determine a geographical position of the mobile satellite receiver. In this case, the evaluation apparatus 232 is designed so as to take into account the geographical position in order to generate raw correction data 135 that represent an item of information regarding atmospheric disturbances in relation to the geographical position.

The determination device 140 has a reading-in apparatus 241 and an identification apparatus 242. The reading-in apparatus 241 is designed so as to read in the raw correction data 135 provided by the provision device 130. More precisely, the reading-in apparatus 241 is designed so as to read in raw correction data 135 from a multiplicity of determination devices 130 that are arranged in a multiplicity of mobile signal receivers that are in the immobile state. Furthermore, the reading-in apparatus 241 is designed so as to forward the read-in raw correction data 135 to the identification apparatus 242. The identification apparatus 242 is designed so as to identify the correction data 145 using the raw correction data 135.

According to the exemplary embodiment illustrated here, the determination device 140 also has an output apparatus 243 for outputting the correction data 145 to a multiplicity of mobile satellite receivers. Alternatively, the determination device 140 may be designed so as to output the correction data 145 to the multiplicity of mobile satellite receivers.

Figure 3:
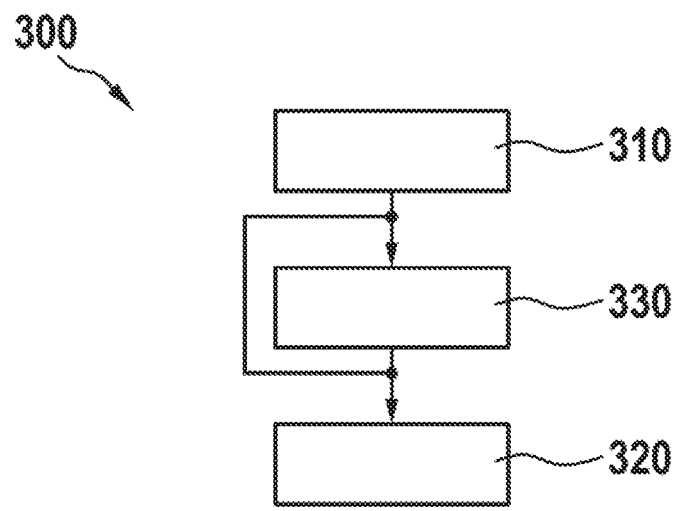
FIG. 3 shows a flowchart of a provision method according to one exemplary embodiment.

FIG. 3 shows a flowchart of a provision method 300 according to one exemplary embodiment. The provision method 300 is able to be performed in order to provide raw correction data for correcting atmospheric disturbances for satellite navigation. In this case, the provision method 300 is able to be performed by way of a provision device from one of the figures described above or a similar device.

In a checking step 310, the method 300 uses at least one sensor signal to check whether a mobile satellite receiver for satellite navigation is in an immobile state. The sensor signal represents a measurement variable dependent on a state of movement of the mobile satellite receiver. Thereafter, in an evaluation step 320, at least one satellite signal transmitted between at least one satellite and the mobile satellite receiver in the immobile state is evaluated with regard to a signal property dependent on atmospheric disturbances in order to generate the raw correction data. The raw correction data represent an item of information regarding the atmospheric disturbances. In other words, in the evaluation step 320, only satellite signals that are transmitted between at least one mobile satellite receiver and at least one satellite when the former is in the immobile state are evaluated.

According to the exemplary embodiment illustrated in FIG. 3, the provision method 300 furthermore has a determination step 330. In the determination step 330, a geographical position of the mobile satellite receiver is determined. Thereafter, in the evaluation step 320, the geographical position determined in the determination step 330 is taken into account in order to generate raw correction data that represent an item of information regarding atmospheric disturbances in relation to the geographical position. In particular, according to one exemplary embodiment, in the determination step 330, the geographical position is determined using the at least one satellite signal. Additionally or alternatively, according to one exemplary embodiment, in the determination step 330, the geographical position is determined using at least one further sensor signal. The further sensor signal constitutes a further measurement variable able to be correlated with the geographical position of the mobile satellite receiver. By way of example, the further measurement variable may be used to derive an item of information regarding the geographical position or the geographical position may be determined by evaluating the further measurement variable. Additionally or alternatively, according to one exemplary embodiment, in the determination step 330, the geographical position is determined using a position signal that represents a geographical position of a stationary apparatus that is temporarily coupled to a system having the mobile satellite receiver. Additionally or alternatively, according to one exemplary embodiment, in the determination step 330, the geographical position is determined using at least one movement signal that represents at least one movement variable by way of which the geographical position of the mobile satellite receiver is able to be identified on the basis of a previous geographical position of the mobile satellite receiver. In particular, the manner in which the geographical position is determined in the determination step 330 is intended to be discussed in more detail below.

According to one exemplary embodiment, the checking step 310 and/or the evaluation step 320 is/are performed repeatedly. In this case, a repetition frequency of a repeated performance of the checking step and/or of the evaluation step is set depending on an energy supply state of the mobile satellite receiver and/or the geographical position at which the mobile satellite receiver in the stationary state is arranged.

According to a further exemplary embodiment, in the evaluation step 320, the raw correction data are generated using a signal property of the at least one satellite signal that relates to a signal propagation time and/or change in signal propagation time of the at least one satellite signal. In this case, the signal property represents a result of a comparison of at least one signal value with respect to at least two transmission frequencies of the at least one satellite signal. In this case, the at least one mobile satellite receiver may be configured as a dual-frequency satellite receiver or the like.

Figure 4:
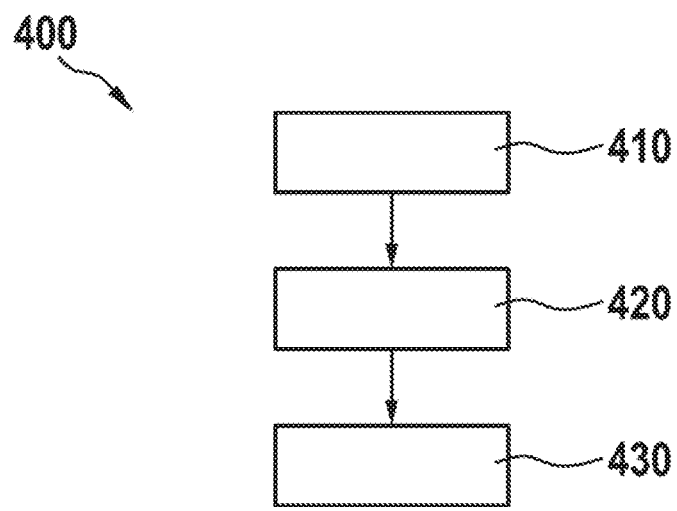
FIG. 4 shows a flowchart of a determination method according to one exemplary embodiment.

FIG. 4 shows a flowchart of a determination method 400 according to one exemplary embodiment. The determination method 400 is able to be performed in order to determine correction data for correcting atmospheric disturbances for satellite navigation. The determination method 400 is able to be performed in connection with the provision method from FIG. 3 or a similar method. The determination method 400 is also able to be performed by way of the determination device from FIG. 1 or FIG. 2 or a similar determination device.

In a reading-in step 410, in the case of the determination method 400, raw correction data that are provided in accordance with the provision method from FIG. 3 or a similar method are read in from a multiplicity of mobile satellite receivers that are in the immobile state. Thereafter, in an identification step 420, the correction data are identified using the raw correction data read in in the reading-in step 410.

According to the exemplary embodiment illustrated in FIG. 4, the determination method 400 also has an output step 430 of outputting the correction data, identified in the identification step 420, to the multiplicity of mobile satellite receivers. The correction data are able to be used in this case for a correction of a transmission of the at least one satellite signal between the at least one satellite and the multiplicity of mobile satellite receivers.

According to one exemplary embodiment, as is also shown at least similarly in FIG. 1, in the reading-in step 410, the raw correction data are read in from a multiplicity of mobile satellite receivers, at least one mobile satellite receiver of which is arranged in a vehicle. According to a further exemplary embodiment, the correction data are identified in the identification step 420 using a multiplicity of reference state signals, using an atmospheric correction model and/or using a model algorithm. In this case, the reference state signals represent signals read in from stationary reference satellite receivers.

With reference to the figures described above, exemplary embodiments and advantages of exemplary embodiments are again briefly summarily explained and/or disclosed below in other words.

Each mobile satellite receiver 120 or navigation terminal 120 or each so-called positioning sensor continuously receives navigation data of the navigation satellites in the form of the satellite signals 115. If a stationary state of the navigation terminal 120 is detected by way of the sensor signal 225 from one or more sensors, for example acceleration sensor, gyroscope, magnetic field sensor, there may be switching to an operating mode as reference station. The satellite signals 115 are evaluated for as long as is guaranteed that the navigation terminal 120 is not moving.

To obtain information for a correction signal or the correction data 145, use may be made for example of methods and variants that are described below.

In one method, the navigation terminal 120 is used similarly to a conventional fixed reference station on the basis of the geographical position identified using other position determination methods, for example location using radar and video sensors using a corresponding map, for as long as the navigation unit 120 is in the stationary state. This method is suitable for example for a vehicle for highly automated driving that has accurate position determination using radar, video or the like. The navigation terminal 120 and thus the vehicle 105 is used as a reference station for as long as it is parked, for example. The information obtained by evaluating the satellite signals 115, for example regarding changes in propagation time in the ionosphere and troposphere, is transmitted to the determination device 140 or to a server or data cloud or cloud. By comparing the raw correction data 135 from vehicles or navigation terminals 120 that are situated close to one another using the determination device 140, accuracy is able to be further increased. The correction data 145 are generated by way of the determination device 140 and then in turn made available in particular to moving navigation terminals 120.

In a further method, a geographical position of the navigation terminal 120 is known. This is the case for example if a vehicle 105 is situated at a charging station for electric vehicles. The location of a charging station, in particular of a public charging station, is known. Due to a calculation of consumed current, it is also known which vehicle 105 is situated at which charging station. In the case of wired charging stations, a certain inaccuracy is possible, but an inaccuracy is able to be compensated by a multiplicity of reference stations in the immediate vicinity. Accuracy of a position determination is higher in the case of inductive charging stations, for example. Using the known geographical position of the vehicle 105, it is possible to use the vehicle 105 as a reference station in the same way as for conventional reference stations.

In a further method, a geographical position of the navigation terminal 120 is initially not known accurately or unknown, but it is able to be checked, using further sensors, for example acceleration sensor, magnetic field, gyroscope or the like, that the navigation terminal 120 is in the immobile state. The navigation terminal 120 or the provision device 130 receives the satellite signals 115 or satellite data, for example continuously, and a hypothetical position of the navigation terminal 120 is determined, in particular in the form of a calculated average position since a last movement. Using the hypothetical position, a correction signal containing correction data 145 may in turn be determined on account of changes in propagation time that arise. The hypothetical position becomes all the more accurate the longer the navigation terminal 120 is in the immobile state. By processing the raw correction data 135 from many navigation terminals 120 in the immediate vicinity, the correction data 145 are again able to be improved on the server side.

According to one exemplary embodiment, short-term changes in propagation time are transmitted to the determination device 140. By analyzing the short-term changes in propagation time using the determination device 140 and comparing changes in propagation time for locally adjacent navigation terminals 120, a change in propagation time caused by the ionosphere and the troposphere is able to be identified, and the correction data 145 are able to be determined.

Generally speaking, it is the case in particular, including with regard to the abovementioned methods and variants, that these are able to be combined as desired within a navigation terminal 120 or in the overall system so as to increase accuracy. By way of example, mobile telephones transmit using one of the two latterly mentioned methods and make information that is obtained available to vehicles 105 using one of the two formerly mentioned methods. A further increase in accuracy is able to be achieved by addition of fixedly installed reference stations that are able to identify changes in propagation time in the ionosphere in a wider geographical context.

In order for example to preserve a battery supply from the point of view of an energy consumption of the navigation terminal 120 and an associated communication unit, such that a vehicle is always definitely able to start, for example, various strategies may be used. By way of example, the operation as a reference station or the data identification function may be switched off if a predefined battery voltage is dropped below. However, if the vehicle 105 is connected to a charging column, at least operation as a reference station may be performed for this time.

To achieve a sufficiently accurate correction signal for a region, the determination device 140 may also influence a frequency of data transmission, for example in a manner dependent on a geographical position of the vehicles 105 containing the navigation terminals 120. There may be provision for the raw correction data 135 to be transmitted less often in conurbations, as more vehicles containing navigation terminals 120 are available there. In rural regions, a more frequent transmission of the raw correction data 135 may be carried out.

In particular, the raw correction data 135 from the individual navigation terminals 120 are transmitted for example to the determination device 140 via a telematics unit and the correction data 145 for a defined geographical region are identified in said determination device. The correction data 145 are then in turn transmitted via radio transmission, for example mobile radio network or satellite, to the navigation terminals 120.

If an exemplary embodiment comprises an "and/or" link between a first feature and a second feature, this should be interpreted to mean that the exemplary embodiment has both the first feature and the second feature according to one embodiment and has either only the first feature or only the second feature according to a further embodiment.

What is claimed is:

1. A method for providing raw correction data for correcting atmospheric disturbances for satellite navigation, the method comprising:
   receiving with a provision device, including a mobile satellite receiver, at least one sensor signal;
   determining with the provision device that the mobile satellite receiver is in an immobile state using the at least one sensor signal;
   receiving with the mobile satellite receiver at least one satellite signal, transmitted from at least one satellite, with the mobile satellite receiver in the immobile state;
   evaluating a signal property of the received at least one satellite signal dependent on atmospheric disturbances; and
   generating the raw correction data based upon the evaluation, wherein the raw correction data represents an item of information regarding the atmospheric disturbances.

2. The method according to claim 1, further comprising:
   determining a geographical position of the mobile satellite receiver, wherein evaluating the signal property of the received at least one satellite signal further comprises:
   taking into account the determined geographical position such that the generated raw correction data represents the item of information regarding the atmospheric disturbances in relation to the geographical position.

3. The method according to claim 2, wherein determining the geographical position comprises:
   determining the geographical position using one or more of the at least one satellite signal, at least one further sensor signal that represents a further measurement variable correlated with the geographical position of the mobile satellite receiver, a position signal that represents a geographical position of a stationary apparatus that is temporarily coupled to a system having the mobile satellite receiver, and at least one movement signal that represents at least one movement variable, by way of which the geographical position of the mobile satellite receiver is able to be identified on basis of a previous geographical position of the mobile satellite receiver.

4. The method according to claim 1, wherein:
   determining that the mobile satellite receiver is in the immobile state comprises repeatedly determining that the mobile satellite receiver is in the immobile state;
   evaluating the signal property comprises repeatedly evaluating the signal property of the at least one satellite signal; and
   a repetition frequency of at least one of the repeated determination and the repeated evaluation is set depending on at least one of an energy supply state and a geographical position of the mobile satellite receiver.

5. The method according to claim 1, wherein:
   the signal property relates to at least one of a signal propagation time and a change in signal propagation time of the at least one satellite signal; and
   the raw correction data represents a result of a comparison of at least two transmission frequencies of the at least one satellite signal.

6. The method according to claim 1, wherein the provision device is one of a plurality of provision devices, and each of the plurality of provision devices generates respective raw correction data, the method further comprising:
   determining correction data for correcting the atmospheric disturbances for the satellite navigation, the determination including:
   reading in the respective raw correction data; and
   identifying the correction data using the respective raw correction data.

7. The method according to claim 6, wherein at least one of the plurality of provision devices is arranged in a vehicle.

8. The method according to claim 6, wherein:
   identifying the correction data includes using at least one of a multiplicity of reference state signals, an atmospheric correction model, and a model algorithm; and
   the multiplicity of reference state signals represent signals read in from stationary reference satellite receivers.

9. The method according to claim 6, further comprising:
   outputting the correction data to the plurality of provision devices,
   wherein the correction data is used for a correction of a transmission of the at least one satellite signal between the at least one satellite and the plurality of provision devices.

10. The method according to the claim 1, wherein a device is configured to at least one of perform and/or drive steps of the method in corresponding units.

11. The method according to claim 1, wherein a computer program is configured to be executed to at least one of perform and drive the method.

12. The method according to claim 11, wherein the computer program is recorded on a non-transitory machine-readable storage medium.

13. The method according to claim 1, further comprising:
   transmitting the generated raw correction data to a determination device, wherein the determination device is arranged remotely from the satellite receiver.

* * * * *

UNITED STATES PATENT AND TRADEMARK OFFICE
CERTIFICATE OF CORRECTION

| | |
|---|---|
| PATENT NO. | : 11,199,629 B2 |
| APPLICATION NO. | : 16/272136 |
| DATED | : December 14, 2021 |
| INVENTOR(S) | : Arnold et al. |

It is certified that error appears in the above-identified patent and that said Letters Patent is hereby corrected as shown below:

In the Claims

In Claim 10, at Column 12, Line 47: "at least one of perform and/or drive" should read --at least one of perform and drive--.

Signed and Sealed this
Twelfth Day of April, 2022

Drew Hirshfeld
*Performing the Functions and Duties of the
Under Secretary of Commerce for Intellectual Property and
Director of the United States Patent and Trademark Office*